United States Patent
Holliday

[11] Patent Number: 5,955,677
[45] Date of Patent: Sep. 21, 1999

[54] METAL SEAL FOR PRESSURE TRANSDUCER

[75] Inventor: Bradley C. Holliday, Claremore, Okla.

[73] Assignee: Geophysical Research Corporation, Tulsa, Okla.

[21] Appl. No.: 08/787,092

[22] Filed: Jan. 22, 1997

[51] Int. Cl.$^6$ .............................. G01L 7/00; E21B 47/06
[52] U.S. Cl. .................. 73/756; 73/152.51; 285/334; 285/333; 285/330
[58] Field of Search ................ 73/756, 152.51, 73/152.52, 152.53, 729.1; 285/334, 333, 330

[56] References Cited

U.S. PATENT DOCUMENTS

| Re. 34,441 | 11/1993 | Ruckenbauer et al. | 73/756 |
|---|---|---|---|
| 495,594 | 4/1893 | Ludlow | 73/756 |
| 3,359,013 | 12/1967 | Knox et al. | 285/334 X |
| 4,629,221 | 12/1986 | Lumsden et al. | 285/334 X |
| 4,649,925 | 3/1987 | Dow et al. | 128/660 |
| 4,676,529 | 6/1987 | McDonald | 285/334 X |
| 4,722,227 | 2/1988 | Grob et al. | 73/706 |
| 5,337,612 | 8/1994 | Evans | 73/706 |

FOREIGN PATENT DOCUMENTS

| 480502 | 8/1916 | France | 73/756 |
|---|---|---|---|

*Primary Examiner*—George M. Dombroske
*Assistant Examiner*—Joseph L. Felber
*Attorney, Agent, or Firm*—Head, Johnson & Kachigian

[57] ABSTRACT

An improved metal seal useful in conjunction with a pressure transducer or other pressure device or vessel. The pressure transducer comprises a pressure housing having an open end and having a housing wall. The housing wall preferably has internal threads and has a terminal end. The pressure transducer has a chamber defined by the housing wall of the pressure housing. The pressure transducer has a mating piece which engages the pressure housing, thereby enclosing the chamber. The mating piece has an externally threaded end for engaging the internal threads of the housing. The mating piece employing the invention has an overlap for engaging the terminal ends of the housing wall to prevent the housing wall from expanding and for forming a seal therewith. The overlap prevents the housing walls from expanding due to high pressures contained in the chamber of the pressure housing. Consequently, by using the overlap, pressure transducers having thin walls are able to withstand higher pressures.

10 Claims, 2 Drawing Sheets

5,955,677

METAL SEAL FOR PRESSURE TRANSDUCER

BACKGROUND OF THE INVENTION

1. Field of the Invention

The present invention relates generally to pressure holding devices or vessels, and, more specifically, to downhole pressure gauges or pressure transducers commonly used in the oil industry. More particularly, this invention relates to a seal for use on such pressure gauges or pressure transducers.

2. Background

Downhole pressure gauges are beneficial for use in oil production. One of the parameters used in determining the amount of oil in a reservoir is pressure. The pressure at the bottom of a well bore provides reliable data because such pressure is the pressure at the face of the oil formation. Downhole pressure is important to production because it allows the prediction of production rates, oil reserves, and the remaining volume in the formation. It is possible to determine the volume of oil in the formation if the amount of oil removed from the formation is known and the drop in pressure can be determined at the formation face.

The pressure at the formation face is also beneficial for sizing and running the well pumps so that such pumps are not allowed to run dry. Additionally, if water is injected into a well at the surface, the downhole pressure must be monitored. If downhole pressure becomes too high, a risk of fracturing and damaging the hole arises. Therefore, a continuous monitoring of the downhole pressure is necessary to produce at the correct rate.

Monitoring of downhole pressure is accomplished by the use of a pressure gauge. The gauge may be a permanent gauge, such as a tubing installed gauge, or a temporary gauge maintained on a wireline or electric line. In the case of a tubing installed gauge, the pressure is routed to the gauge from inside the tubing. In some designs, this creates a high internal pressure in the adapter that attaches the pressure transducer to the tubing.

It is desirable to minimize the outside diameter of the gauge to allow the gauge to be used in smaller tubing or a smaller annulus. The minimization of dimensions leads to the use of ultra-high strength materials with thin walls for pressure gauge design. Pressure gauges having thin walls are more apt to fail at the seal due to the outward expansion of the thin walls caused by the tremendous internal pressures. This effect is not diminished by the use of ultra-high strength materials since the expansion is not dependent upon the strength of the material. The expansion is dependent upon the geometry, temperature, and the modulus of elasticity, which are not necessarily improved by using a stronger material. However, stronger materials do delay the onset of plastic deformation, which is where expansion rapidly increases.

Conventional seals typically utilize elastomeric materials which have a short service life when exposed to corrosive fluids and high temperatures. Corrosive fluids and high temperatures are conditions often encountered in oil and gas wells. Since it is expensive to pull a permanent downhole gauge, it is beneficial to have a gauge with a long service life so that the gauge can remain downhole for a long period of time. One solution to this problem is to use a metal seal such as a weld or a metal to metal contact seal.

Many permanent gauges have two or more housing components joined by welds. However, if the gauge must be attached to the tubing at the well site, welding is not an option since it is not permitted at the well site for safety reasons. Therefore, the seal between the gauge and the mandrel can not be welded joint.

Though temporary gauges do not have long downhole residency requirements, they often have thin walls in order to allow room for the necessary internal components. These gauges normally have a sealed pressure housing and are exposed to corrosive fluids and high temperatures. An inert gas atmosphere, such as helium or argon or a mixture of the two, can be used to protect the internal electronics from oxidizing at high temperatures.

A metal seal is desirable because it will not deteriorate over time like an elastomeric seal when exposed to high temperature corrosive fluids. This is very desirable when an inert gas is used because the gas would escape from the pressure housing when the elastomeric seals were replaced. It is desirable to use a secondary o-ring seal in case the metal seal would be damaged or worn due to maintenance procedures, which should be greatly reduced or eliminated with the use of an inert gas and metal seals.

When used as a high pressure seal, conventional metal seals fail to overcome the limitations discussed above as they may bell out due to excessive torque and thus lose their seal.

Consequently, it is an object of this invention to create a seal for pressure holding devices or vessels, and especially downhole pressure transducers, that does not need to be maintained, that does not require welding, that does not utilize an elastomeric seal as the primary seal.

It is a further object of this invention that the seal require less makeup torque than conventional metal seals to form a seal for high pressure applications.

BRIEF SUMMARY OF THE INVENTION

The design of the present invention overcomes the problems associated with prior art seals by locking the thin wall of a pressure housing under an external overlap formed on the exterior of a mating piece in a manner wherein a line contact seal is achieved. The external overlap of the mating piece increases the rigidity of the seal joint, thereby reducing the expansion of the seal at high pressures. The overlap forms a circumferential tapered seat for receiving the terminal end of the thin housing wall. The tapered seat is comprised of an outer wall, an inner wall and a corner radius defining an acute angle. The terminal end of the thin housing wall is of a smaller angle than the tapered seat and terminates in an end surface having a width. This prevents the terminal end of the housing wall from sealing in the radius of the tapered seat and instead a line contact seal is formed at a point along the outer wall of the tapered seat. The line contact maximizes stress and deformation, thereby minimizing the torque required to obtain an adequate seal.

In one aspect of the invention, the locking overlap is used to provide a single metal-to-metal seal for a one-inch diameter pressure transducer that will withstand high pressures, specifically 20,000 psi or more, remotely applied to the transducer without failing.

In another aspect of the invention the locking overlap is used as a primary seal and conventional O-rings are used to provide a protected secondary seal.

In addition to its use in connection with one-inch diameter downhole pressure transducers, the seal design of the present invention is also useful in other pressure housing applications where a non-maintenance seal is required. For example, tools utilizing an inert gas atmosphere to protect electronic components in a housing are benefitted by the present invention insofar as using the metal-to-metal seal as the primary seal means not having to release the gases in order to change an O-ring seal. The O-ring will not be worn because it is protected by the metal seal; thus it will not require replacement.

Though some pressure housings or vessels may have a diameter greater than one inch, space requirements for internal components may necessitate the use of housing walls too thin to allow for an O-ring seal or an O-ring backup of the metal seal. The present invention is also indicated for these applications as well since the metal-to-metal seal can function as a primary seal without a requirement for a secondary elastomeric seal.

Examples of tools wherein the present invention may be utilized include pressure/temperature gauges, flowmeters, fast responding temperature gauges, casing collar locators and correlation gamma and fluid identification equipment.

Prior art metal seal designs using conventional cone seals have been attempted. However, even though the wall thickness, the angle on the terminal end of the thin wall, and the corresponding angle on the cone of the mating piece have been varied in attempts to improve the design, these types of seals do not successfully contain internal pressures in excess of 20,000 psi. The failure to contain high internal pressure is due to the expansion of the thin walls. A conventional cone seal can typically hold external pressures in excess of 20,000 psi with thin walls. Higher internal pressures, in excess of 20,000 psi, can be obtained by using thicker walls and high tightening torque.

The improved metal seal of the present invention requires less makeup torque to form the seal at high internal pressures due to the unique seal geometry which achieves a line contact seal. As the pressure increases, expansion of the thin wall is restrained by the tapered seat. This action maintains the seal even though the parts are being pushed apart by the internal pressure. In contrast, with conventional cone seals, a much higher initial torque is needed to counteract this tendency for the parts to axially separate.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

DETAILED DESCRIPTION OF THE INVENTION

Figure 1A:
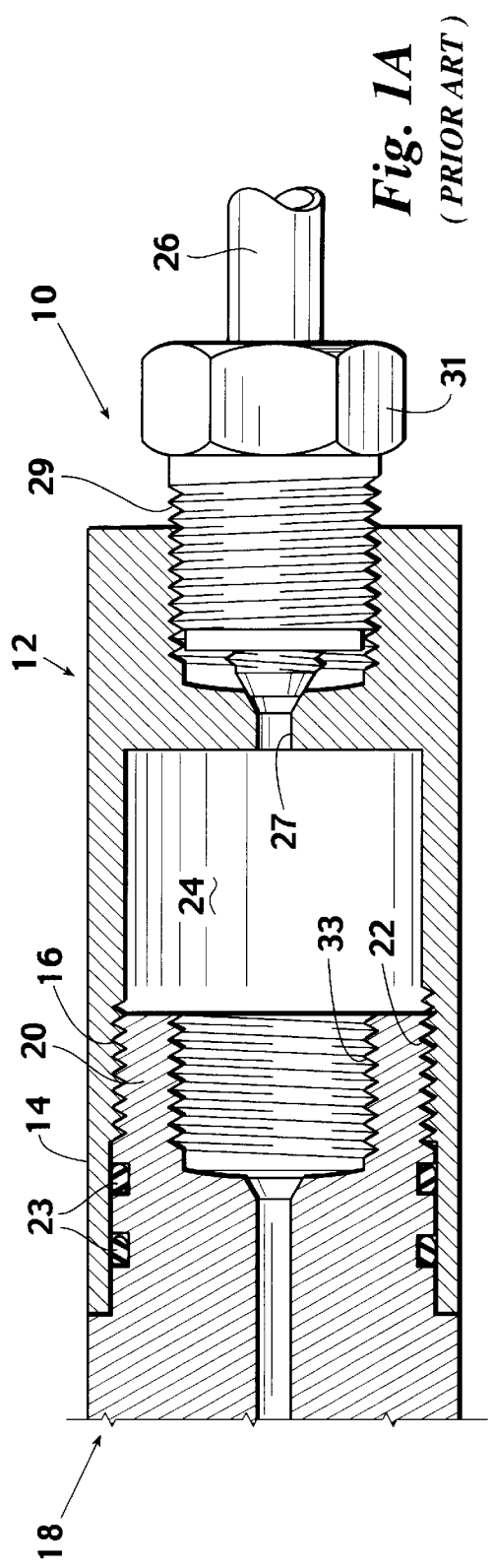
FIG. 1A shows a typical prior art pressure transducer.

Referring now to FIG. 1A, shown is a conventional pressure transducer designated generally by the reference numeral 10. Conventional transducer 10 is comprised of a pressure housing 12 having a housing wall or thin wall 14 formed thereon. Internal threads 16 are formed on the interior of the thin wall 14. A mating piece 18 has an end 20 with external threads 22. The external threads 22 of the end 20 of the mating piece 18 engage the internal threads 16 of the housing wall or thin wall 14 of the pressure housing 12 to form a chamber 24 in pressure housing 12. A seal is facilitated by the placement of O-rings 23 between the mating piece 18 and the housing wall or thin wall 14 of pressure housing 12. A pressure line 26 is provided from a remote location to facilitate the pressurization of chamber 24 via aperture 27. The pressure line 26 is threadably affixed to the pressure housing 12 with a pressure fitting 29 and nut 31. It should be kept in mind that there are many ways well known in the art to provide pressure from a remote location, and that the foregoing description is merely illustrative of one of several different approaches.

So as not to complicate the drawings, certain common features of conventional pressure transducers are not illustrated. This allows the drawings to be focused on the elements necessary to achieve a proper understanding of the invention. One skilled in the art understands that chamber 24 normally contains a bellows threadably affixed to the mating piece 18 at receiving area 33. The bellows separates the normally corrosive fluid being measured from the non-corrosive measuring fluids residing inside the bellows. The electronic components of the pressure transducer used to generate signals indicative of the pressure measurement are generally located behind what is designated as the mating piece 18.

A difficulty of the design of the conventional pressure transducer 10 is that when high pressures are present in chamber 24, the housing wall or thin wall 14 has a tendency to expand, thereby losing the seal formed by the O-rings 23. This allows for the depressurization of the chamber 24.

Figure 1B:
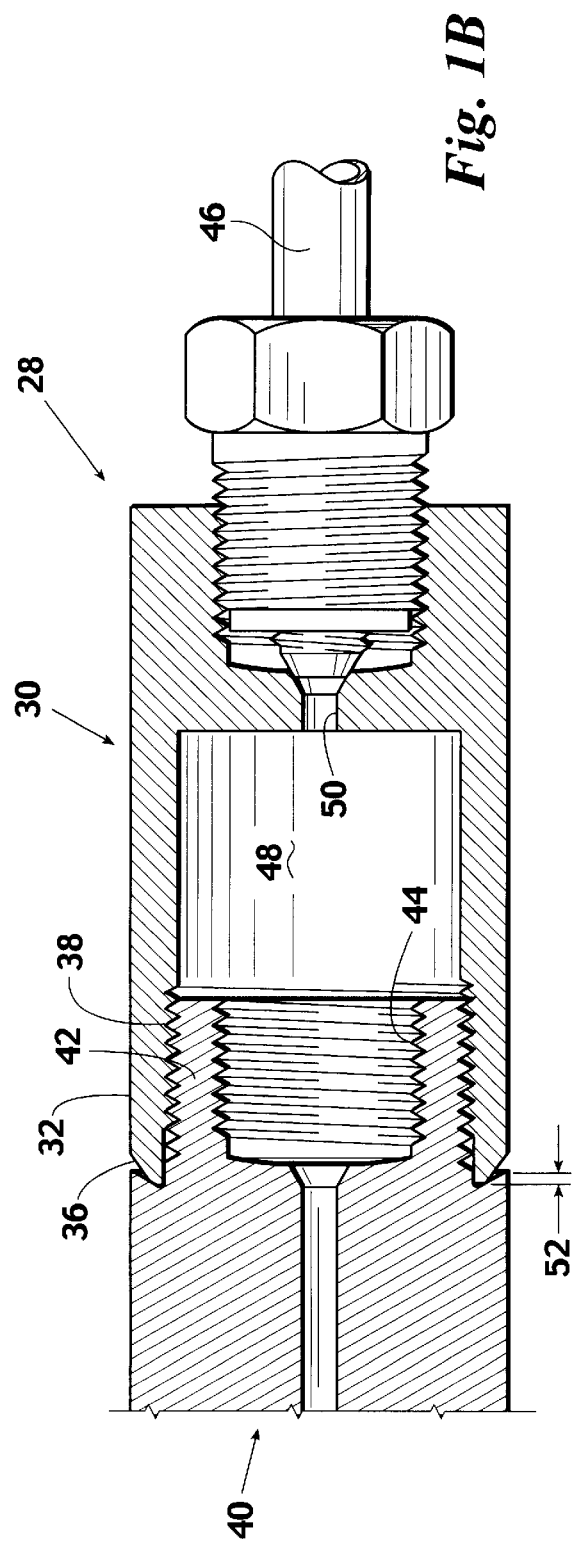
FIG. 1B shows a typical pressure transducer design incorporating the improved metal seal of the present invention.

Now referring to FIG. 1B, shown is an improved pressure transducer, designated generally by the reference numeral 28, which utilizes the present invention. Similar to conventional pressure transducers, improved pressure transducer 28 is comprised of pressure housing 30 having a thin housing wall 32. The housing wall 32 has terminal end 36 and is provided with internal threads 38. A mating piece 40 is provided with an end 42 having external threads 44 provided thereon. The external threads 44 on the end 42 of the mating piece 40 engage with the internal threads 38 of the thin housing wall 32 of the pressure housing 30. A pressure line 46 is provided to pressurize chamber 48 via aperture 50.

In contradistinction to conventional pressure transducers, however, the mating piece 40 is provided with overlap 52 for engaging the terminal end 36 of the thin housing wall 32. This prevents the housing wall 32 from outwardly expanding, and facilitates a metal-to-metal seal between the mating piece 40 and the pressure housing 30. The engagement of the overlap 52 with the terminal end 36 is set forth in greater detail in FIG. 2.

Figure 2:
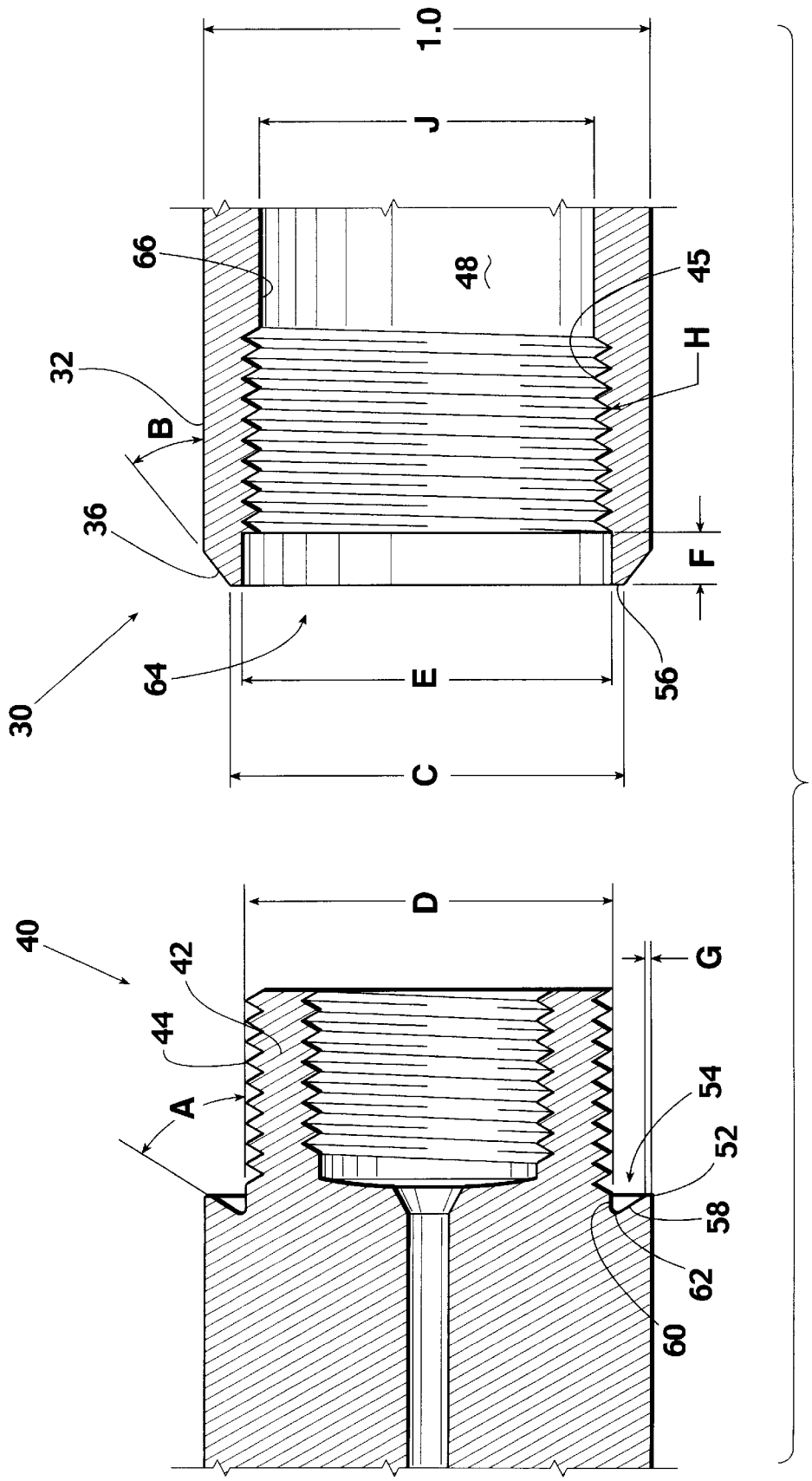
FIG. 2 shows an exploded view of a typical pressure transducer design incorporating the improved metal seal of the present invention.

Now referring to FIG. 2, shown is a mating piece designated generally by the reference numeral 40 having an engaging end 42 with external threads 44 thereon. The overlap 52 is shown forming a tapered seat, designated generally as element 54, for receiving the terminal end 36 of the thin housing wall 32 of the pressure housing 30. A cross-sectional view of the tapered seat 54 reveals that the tapered seat 54 is formed in an acute angle A. It is convenient for acute angle A to be about 60° so that standard tool inserts can be used in the machining process; however, other angles could be used successfully. The overlap 52 increases as angle A decreases.

The terminal end 36 of the housing wall 32 is preferably tapered to an acute angle B as shown in FIG. 2. Preferably, acute angle B is less than acute angle A, allowing for a line contact seal to be achieved within the tapered seat 54. In addition, in the preferred embodiment the terminal end 36 of the housing wall 32 terminates in an end surface 56 having a width. Since the terminal end 36 of the housing wall 32 is flat rather than rounded off it will not seal in the radius of the tapered seat 54 nor will it tend to break off or round off which would result in a poor sealing surface.

The tapered seat 54 is comprised of an outer wall 58, an inner wall 60, and a corner radius 62. In the preferred embodiment, the width of the end surface 56 on the terminal end 36 of the housing wall 32 is of a dimension such that the terminal end 36 engages the outer wall 58 of tapered seat 54, but does not make contact with or engage the tapered seat 54 on the corner radius 62. In other words, there is a small empty space between the end surface 56 and the margin of the mating piece 40 defining the corner radius 62. It is intended that a line contact metal-to-metal seal be achieved at the point of contact between the corner of the end surface 56 of the thin housing wall 32 and the outer wall 58 of the tapered seat 54. By providing the overlap 52, the pressure contained within chamber 48 is unable to outwardly expand the thin housing wall 32. Therefore, a metal seal able to contain extremely high pressures is obtained.

In practice, the engaging end 42 of the mating piece 40 is threaded into the open end 64 of the pressure housing 30. The circumferential tapered seat 54 engages the terminal end 36 of the thin wall 32 thereby preventing the expansion of the thin wall 32. Expansion of the thin wall 32 would result in a loss of the seal between the mating piece 40 and the pressure housing 30, resulting in depressurization of the chamber 48. By screwing the externally threaded end of the mating piece 40 into the open end 64 of the pressure housing 30, the chamber 48 is enclosed.

The overlap 52 is, of course, limited by the corner radius 62, the outside diameter of mating piece 40 and the thread diameter D, as shown in FIG. 2. As mentioned above, preferably angle B should be less than angle A to insure that a line contact seal is obtained at diameter C. Care should be taken that the angles do not overlap at the tolerance extremes. Preferably, diameter C should be large enough so that sealing contact is not made on corner radius 62, but diameter C should be small enough to ensure maximum overlap as axial separation forces increase as the diameter of the line contact increases. Diameter D should be slightly greater than the maximum diameter of external threads 44 to avoid machining problems, such as skimming off the external threads 44 of the mating piece 40. Diameter E should, of course, clear diameter D. Diameter D should be minimized for maximum strength and maximum stiffness. Bore depth F on pressure housing 30 should be deep enough to keep the engaging end 42 of the mating piece 40 from bottoming out before the tapered seat 54 makes contact with the terminal end 36 of the thin housing wall 32. Depth G, which measures a small outer circumferential shoulder, should be minimized in order to maximize overlap. Outside thread diameter H of internal threads 45 should be minimized to maximize strength and stiffness. Finally, bore J, which defines chamber 48, should be minimized to maximize strength and stiffness.

The resulting improved seal is useful for forming a metal-to-metal seal. A metal-to-metal seal is beneficial in high temperature applications and/or corrosive fluid environments. However, the overlap 52, comprised of tapered seat 54, may be used in combination with other types of seals, such as in conjunction with O-rings, to provide a sealed chamber where the metal-to-metal seal is the primary seal and the O-ring functions as a secondary sealing means. This would prove especially beneficial in extending the life of the O-ring, which would be isolated from the corrosive fluids being measured.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A pressure transducer adapted to withstand high internal pressures, comprising:

a pressure housing having an open end and having a housing wall, said housing wall having internal threads and a terminal end; and a mating piece for engaging said pressure housing open end, said mating piece having an externally threaded end for engaging said internal threads of said housing, said mating piece having a tapered seat for engaging said terminal end of said housing wall, said tapered seat overlapping a portion of said terminal end of said housing wall to prevent said housing wall from expanding and for forming a seal therewith.

2. A pressure transducer according to claim 1 wherein said tapered seat comprises an outer wall, an inner wall and a corner radius and having an acute angle A measured between said outer wall and said inner wall.

3. A pressure transducer according to claim 2 wherein said acute angle A is between 45° and 75°.

4. A pressure transducer according to claim 2 wherein said terminal end of said housing wall comprises and outer wall and an inner wall wherein said outer wall and said inner wall are tapered to form angle B.

5. A pressure transducer according to claim 4 wherein said acute angle B of said terminal end of said housing wall is less than said acute angle A of said tapered seat of said mating piece.

6. A pressure transducer according to claim 1 wherein said terminal end of said housing wall terminates in an end surface having a width.

7. A pressure transducer according to claim 6 wherein said tapered seat is comprised of an outer wall and an inner wall, said outer wall and said inner wall extending from a corner radius.

8. A pressure transducer according to claim 7 wherein said width of said housing wall terminal end surface is sufficient to engage said outer wall of said tapered seat but does not engage said corner radius of said tapered seat.

9. A metal seal for a pressurized chamber, and metal seal comprising:

a cylindrical housing having a thin wall, said thin wall having an internally threaded inner surface and a terminal end;

a mating piece, said mating piece having an externally threaded engaging end and a circumferential tapered seat, said externally threaded engaging end of said mating piece for threadedly mating with said internally threaded inner surface of siad thin wall of said cylindrical housing; and said tapered seat for engaging said terminal end of said thin wall, and tapered seat overlapping a portion of said terminal end of said thin wall to prevent said thin wall from expanding and for forming a seal therewith.

10. A method of maintaining a metal seal in a thin walled pressure vessel, comprising:

forming a pressure housing having an open end, said pressure housing comprised of a thin wall, said thin wall having internal threads and a terminal end;

forming a mating piece having an externally threaded end and an external circumferential tapered seat;

screwing said externally threaded end of said mating piece into said open end of said pressure housing, said externally threaded end of said mating piece engaging said internal threads of said thin wall of said pressure housing; and engaging said terminal end of said thin wall of said pressure housing with said external circumferential tapered seat of said mating piece, said tapered seat overlapping a portion of said terminal end of said housing wall to prevent said housing wall from expanding and for forming a seal therewith.

* * * * *